US006931635B2

(12) United States Patent
Inagaki et al.

(10) Patent No.: US 6,931,635 B2
(45) Date of Patent: Aug. 16, 2005

(54) PROGRAM OPTIMIZATION

(75) Inventors: Tatsushi Inagaki, Machida (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 10/020,656

(22) Filed: Oct. 29, 2001

(65) Prior Publication Data

US 2002/0056078 A1 May 9, 2002

(30) Foreign Application Priority Data

Oct. 30, 2000 (JP) ........................................ 2000-331427

(51) Int. Cl.$^7$ ................................................. G06F 9/45
(52) U.S. Cl. ....................... 717/157; 717/133; 717/144; 712/244
(58) Field of Search ................. 717/110–112, 131–133, 717/140–161; 712/233–244

(56) References Cited

U.S. PATENT DOCUMENTS 6,505,296 B2    1/2003  Morris et al. ............... 712/244

FOREIGN PATENT DOCUMENTS

JP          10-133884         5/1998

OTHER PUBLICATIONS

Chambers et al., "Dependence Analysis for Java", ACM, pp.: 1–18, 1999.*
Choi et al., "Efficient and Precise Modeling of Exception for the Analysis of Java Programs", ACM, pp.: 21–31, 1999.*
Dulong et al., "An Overview of the Intel™ IA–64 Compiler", Intel Technology Journal Q4, pp.: 1–15, 1999.*

* cited by examiner

*Primary Examiner*—Ted T. Vo
(74) *Attorney, Agent, or Firm*—Michael J. Buchenhorner; Casey P. August

(57) ABSTRACT

A program optimization method for converting program source code written in a programming language into machine language includes steps of: analyzing a target program and detecting an exception generative instruction, which may generate an exception, and exception generation detection instructions, which brunches a process to an exception process when an exception occurrence condition is detected and an exception has occurred. The method also includes steps of dividing the exception generation detection instructions into first instructions, for the detection of exception occurrence conditions, and into second instructions, for branching processes to the exception process when the exception occurrence conditions are detected; and establishing dependencies among program instructions, so that when one of the exception occurrence conditions is detected the process is shifted from a first instruction to a second instruction, and so that when none of the exception occurrence conditions are detected, the process is shifted from a first instruction to an exception generative instruction.

19 Claims, 16 Drawing Sheets

(A)
```
double    test    (double a[], double b[], int i, int j) {
    return  a[i]   + b[j];
}
```

(B)

| | | |
|---|---|---|
| NULL | | a |
| LENGTH | t= | a |
| SIZE | | t, j |
| LOAD | x= | a, j |
| NULL | | b |
| LENGTH | t= | b |
| SIZE | | t, k |
| LOAD | y= | b, k |
| ADD | z= | x, y |

Fig. 7

(A)
```
void    test    (double a[], double b[], double c[],
                 int i, int j, int k)   {
    a[i] = b[j] + c[k];
}
```

(B)

| NULL   |     | b       |
|--------|-----|---------|
| LENGTH | t=  | b       |
| SIZE   |     | t, j    |
| LOAD   | x=  | b, j    |
| NULL   |     | c       |
| LENGTH | t=  | c       |
| SIZE   |     | t, k    |
| LOAD   | y=  | c, k    |
| ADD    | z=  | x, y    |
| NULL   |     | a       |
| LENGTH | t=  | a       |
| SIZE   |     | t, i    |
| STORE  |     | a, i, z |

Fig. 10

|  | NullPointerException | ArrayIndexOutOf BoundsException | Check of representative flag |
|---|---|---|---|
| Normal execution | None | cmp idx, [arrh]<br>jae eHandler | None |
| Speculative execution | cmp arrh, 00h<br>jeq flHandler | cmp idx, [arrh]<br>jae flHandler | cmp flag, 00h<br>jne selHandler |

Fig. 15

Input

$V$: A set of vertexes corresponding to quadruple operators $E$: A set of edges corresponding to the dependency between operators $G(V, E)$: DAG representing a program $\top \in V$: Virtual vertex (top) preceding all operators with no preceding operator $\bot \in V$: Virtual vertex (bottom) succeeding all operators with no succeeding operator $cy(v)$: The number of machine cycles required for the execution of an operation at vertex $v$ $cp(G)$: The critical path length of a DAG representing a program when the order restriction due to an exception is ignored

Procedures (calculation of the slackness of a vertex)

$lb(v)$: The level of vertex $v$ from the bottom when the order restriction due to an exception is ignored 1. $lb(v)=0$ when there is no succeeding vertex
2. When there is a succeeding vertex, $lb(v) = \max(lb(s)) + cy(v)$, where $s \in succ(v)$ for a set of vertexes that due to exception succeed $v$ along the edge other than the order restriction edge $lt(v)$: The level of vertex $v$ from the top when the order restriction due to an exception is ignored 1. $lt(v)=0$ when there is no preceding vertex
2. When there is a preceding vertex, $lt(v) = \max(lt(p) + cy(v))$, where $p \in pred(v)$ for a set of vertexes that due to exception precede $v$ along the edge other than the order restriction edge $sl(v)$: The slackness of vertex $v$ when the order restriction due to an exception is ignored $sl(v) = cp(G) - lt(v) - lb(v)$.

Fig. 16

|  | NullPointerException | ArrayIndexOutOf BoundsException | Check of representative flag |
|---|---|---|---|
| Normal execution | tlei arrh, 00h | lw len, [arrh]<br>tlle idx, len | None |
| Speculative execution | cmp arrh, 00h<br>beq flHandler | lw len, [arrh]<br>cmpl idx, len<br>bgt flHandler | bne cr2, selHandler |

Fig. 17

|  | NullPointerException | ArrayIndexOutOf BoundsException | Check of representative flag |
|---|---|---|---|
| Normal execution | cmp.ne p1, p2 =<br>00h, arrh<br>(p1) br eHandler | ld8 len = [arrh]<br>cmp.ltu p1, p2 =<br>idx, len<br>(p1) br eHandler | None |
| Speculative execution | cmp.ne.and<br>p1,p2 = 00h, arrh | ld8 len = [arrh]<br>cmp.ltu.and<br>p1, p2 = idx, len | (p1) br selHandler |

Fig. 18

PROGRAM OPTIMIZATION

FIELD OF THE INVENTION

The present invention relates to a program optimization methods, compilers and apparatuses for ensuring the parallel execution of instructions for a program that includes an instruction that may generate an exception (hereinafter referred to as an exception generative instruction).

BACKGROUND OF THE INVENTION

Generally, when compiling the source code of a program written in a programming language, the program is optimized in order to increase the execution speed attained by a computer.

Various optimization methods are available. As one optimization method, on the assumption that the parallel execution of instructions is performed by a processor such as a CPU that is compatible with the architecture of the IA-64 produced by Intel Corp. and Hewlett Packard Corp., the order of instructions is changed for a code scheduling process that extracts parallelisms, so that as many instructions as possible can be issued in parallel.

However, in a program, various restrictions may be placed on the changing of the order of instructions, and only a limited code scheduling function may be available. Although the restrictions imposed in such a case include those associated with control, memory access and exceptions, a hardware support mechanism is available and practically employed that reduces the effects of the control and memory access restrictions. As yet, however, no hardware support mechanism has been implemented that reduces the effects arising from exception restrictions.

When parallelisms are extracted as instructions from the code of a program, exceptions generated by preceding instructions must be processed. According to a specific conventional method employed for this processing, exceptions generated by instructions are not immediately executed. Instead, whether exceptions have occurred is determined at locations whereat instructions were originally located in the program prior to optimization, and then, processing of the actual exceptions is performed. Therefore, exception generative instructions can be performed in advance, while original context is maintained at the sites at which exceptions occurred.

Since an instruction that may generate an exception is speculatively executed and a parallelism is extracted, the conventional technique has assumed hardware support for the restriction of an exception (hereinafter referred to as a speculative exception) that occurs due to an exception generative instruction that is speculatively executed. This type of conventional technique is disclosed, for example, in document 1 "Sentinel Scheduling: A Model For Compiler-Controlled Speculative Execution", Scott A Mahlke, William Y. Chen, Roger A. Bringmann, Rechard E. Hank, Wen-Mei W. Hwu, B. Ramkrishna Rau and Michael S. Schlansker, ACM Transactions On Computer Systems, Vol. 11, No. 4, November 1993, pp. 376–408.

In document 1, a method is proposed whereby, under hardware support, a compiler speculatively moves an instruction and generates compensation code when an exception has occurred. In the hardware assumed here, for a speculative instruction, a special value is obtained through the calculation, instead of the occurrence, of an exception. Thereafter, this special value is transiently transmitted by a succeeding speculative instruction and a non-speculative instruction generates an exception when it is employed. An instruction for determining whether an exception has actually occurred is called a sentinel instruction.

According to this conventional technique, the exception generative instruction is speculatively scheduled in the following manner.

1. The last instruction that employs a generated value (potential sentinel instruction) is obtained for each exception generative instruction.
2. List scheduling is used to obtain the earliest execution time for each instruction. When an exception generative instruction is scheduled beyond the branch, side effects (writing to memory) and another exception generative instruction, the pertinent instruction is speculative. Therefore, as needed, an explicit sentinel instruction is generated using the information obtained at step 1.
3. When software is employed for recovery from the exception state, compensation code is generated for a handler when an exception corresponding to each sentinel instruction has occurred.

Furthermore, another conventional technique of this type is disclosed in Japanese Unexamined Patent Publication No. Hei 12-020320. According to the technique disclosed in this publication, speculative execution of an exception generative instruction is implemented by a compiler and with the support of a run-time library.

This conventional technique speculatively executes an exception generative instruction in the following manner.

1. A compiler registers, as an interrupt inhibited interval, a final portion of generated object code wherein the execution order of instructions is changed from the original programmed order by the speculative execution of an exception generative instruction.
2. When an exception has occurred, an exception handler dynamically generates and executes compensation code based on the interrupt inhibited interval information.

[Problems to be Solved by the Invention]

As is described above, a variety of restrictions are placed on code scheduling when program instructions are executed in parallel, and no special mechanism for reducing these restrictions for exceptions is implemented under restriction hardware support. Whereas, in a language, such as Java, in which strict handling of exceptions is necessary, restrictions existing between exception generative instructions greatly affect the extraction of parallelisms for program instructions. Thus, it is difficult for a compiler to extract parallelisms for instructions from a program that is written in a language, such as the Java, in which the strict handling of exceptions is a requirement.

A more detailed explanation will be given using the Java language. The specifications for the Java language define the strict handling of exception conditions that occur during the execution of a program. An exception state defined by a system (a case wherein a null object pointer is used, a case wherein an access is issued with a subscript that exceeds the length of an array, or a case wherein the division of an integer by 0 is attempted) or an exception state defined by a user can be detected during the execution of a program, and can be processed by a user defined exception handler. Then, when the execution of the handler has been completed, program control exits the area wherein the exception was detected.

Since the control flow is changed by the occurrence of an exception, an overall order is maintained between the occurrence of side effects (the element and the class of an array or the writing of an object to a field) in a program and the generation of an exception. That is, to execute a user defined exception handler, the following two program conditions must be satisfied.
1. All side effects occurring before the appearance of an exception must be observed.
2. No side effects occurring after the appearance of an exception must be observed.

In Java, basic operations, such as the reading and the writing of the elements of an array and of an object to a field, are accompanied by the occurrence of an exception during the execution of a program. That is, when a Java program is complied and Java instructions are translated into machine language instructions, basic operation statements are transformed into instructions for detecting exceptions and into memory access or calculation process for performing the actual operations. Memory access and calculation processes may appear exceptions. An exception generated here is a processor (hardware) state that is the result of an access violation, or of a divide overflow produced by an attempt to divide by 0. Another exception that may accompany the execution of a program is a program execution state precipitated by the inclusion of data that does not conform to the specifications of the programming language. In the following explanation, when the first exception must be specifically distinguished from other exceptions, this is called a hardware exception. A hardware exception occurs when the correct execution of a machine language program can not be continued because a program error has occurred, a processor has read data from or written data to an incorrect memory area, or the execution of an impossible calculation has been attempted. Other exceptions are those defined as error processes by a programming language, or a program, when due to a user error during the writing of a program an element that exceeds the size of an array is read or written or an incorrect input value is supplied for a function.

To avoid the occurrence of hardware exceptions, restrictions are placed on the code scheduling order for instructions for performing side effects, instructions for detecting the occurrence of an exception and generative instructions for exceptions. Since accesses of array elements and of field variables, both of which are accompanied by restrictions that are imposed on order execution, frequently appear in a Java program, for code scheduling, these restrictions greatly interfere with the process for extracting parallelisms for instructions.

In addition, as is described above, an exception that is generated by a previously issued instruction must be processed when the parallelism of an instruction for a program is extracted. Conventionally, an exception that is generated by an instruction is not immediately performed, and instead, whether or not the exception occurred is determined at the original location, before optimization, of the instruction in the program, and then the actual exception process is performed.

In this case, however, the cost of determining for an instruction whether an exception was previously generated can not be ignored. For the above IA-64, for example, special machine language code for detecting a speculative exception must be prepared, and when the instruction is greatly displaced, it is easy to understand that the program execution speed will be greatly affected by the instruction to ascertain whether an exception occurred.

The conventional technique described in reference 1 can speculatively execute an instruction that may generate a hardware exception, but the order restrictions still remain between an instruction including side effects and an instruction for detecting the occurrence of an exception. In order to speculatively execute an instruction for providing side effects, a hardware cost is imposed when writing to memory is canceled.

In addition, since hardware support is required, this conventional technique can not be used directly for a common processor lacking the requisite hardware for the speculative execution of an instruction.

Furthermore, it is not practical to employ software to emulate the conventional method because of the high cost that is imposed for additional instructions. Therefore, in this conventional technique, the overhead is increased merely by the speculative execution of hardware exception generative instructions and by the use of a model for the recovery from the exception state. And the technique can not satisfactorily reduce the order restrictions imposed on the exception generative instructions of the compiler for the Java language.

The conventional technique described in Japanese Unexamined Patent Publication No. Hei 12-020320 can be implemented without any additional software overhead when an exception does not occur. However, since compensation code is generated by the exception handler during the execution of the program, only after all machine language instruction sequence have been determined is this technique employed for optimization, i.e., only after the allocation of registers for the optimization of the code scheduling. Thus, parallelisms due to the speculative execution of the exception generative instructions can not be employed for an optimization process that is accompanied by code transformation.

It is, therefore, one object of the present invention to employ software for the reduction of the preceding restrictions imposed on an exception generative instruction for another instruction, so that program instruction parallelisms, including exception generative instructions, can effectively be obtained.

SUMMARY OF THE INVENTION

Accordingly, the present invention provides a program optimization method for converting program source code written in a programming language into machine language comprising the steps of: analyzing a target program and detecting exception generative instructions and exception generation detection instructions; dividing the exception generation detection instructions into first instructions, for the detection of exception occurrence conditions, and second instructions, for branching processes to exception processes when the exception occurrence conditions are detected; and establishing dependencies among program instructions, so that when one of the exception occurrence conditions is detected the process is shifted from a first instruction to a second instruction, and so that when none of the exception occurrence conditions are detected the process is shifted from a first instruction to an exception generative instruction.

When the program is transformed in this manner and the dependencies are established, the order restrictions imposed on the exception generative instructions can be reduced.

The program optimization method, following the step for establishing the dependencies among the instructions, further comprises a step of: collecting multiple second instructions obtained based on multiple exception generation detection instructions detected within a predetermined range of the program. Thus, overall determination is performed based on the detection of the exception occurrence conditions by multiple first instructions, which are obtained based on multiple exception generation detection instructions.

In more detail, according to the program optimization method, the step of dividing the exception generation detection instructions includes a step of generating flag setting instructions, as the first instructions, when the exception occurrence conditions are detected. And the step of collecting the second instructions includes a step of: detecting the occurrence of exceptions, when flags are set for at least one of the multiple first instructions obtained based on the multiple exception generation detection instructions; and generating instructions for shifting processes so that the first instructions exchange positions with the second instructions. A basic block can be employed as a predetermined range for the program. When one flag is employed to collectively determine the occurrence of exceptions in a basic block, only one branching condition is required, as software overhead, for actually detecting the occurrence of an exception.

The program optimization method, following the step of detecting the exception generative instruction, further comprises a step of: generating compensation code, when an exception generative instruction is accompanied by side effects, for storing order restrictions that are present before the exception generation detection instruction is divided and that concern the side effects. The side effects referred to here are the writing of predetermined data to memory, which is a procedure that is performed in accordance with the execution of the instruction.

When the CPU of a computer for executing a complied program includes a function for executing a predicted instruction, in order to protect the exception generative instruction, following the step of setting the dependencies for the instruction, the program optimization method further comprises a step of: defining the first instruction as a conditional branch and allocating a predicate so as to reflect the conditional branch.

Whereas, when the CPU of a computer for executing a complied program does not provide a function for executing a predicated instruction, in order to protect the exception generative instruction, following the step of setting the dependencies for the instructions, the program optimization method further comprises a step of: defining a first instruction as a conditional branch, and according to the result of code scheduling, generating a compensation code at a branching destination for the first instruction, so as to establish the order restrictions concerning the exception generation detection instruction before the exception generation detection instruction is divided into the first and the second instructions.

According to the present invention, a computer program can be prepared for permitting a computer to perform a compiling process, including the above optimization method, and the present invention can be provided as a storage medium on which the computer program is stored, or an apparatus for transmitting the computer program. Further, the present invention can be provided as a computer that includes a compiler that can execute the computer program.

According to the invention, a compiler for converting the source code for a program written in a programming language into machine language and for optimizing the program comprises: a graph generator for analyzing a target program and for generating a graph showing the dependencies of operations in the program; a graph editing unit for editing the graph and for reducing order restrictions imposed on the operations due to the occurrence of an exception; and a code reproduction unit for generating program code that reflects the dependencies of the operations of the edited graph; wherein the graph editing unit detects an exception generative instruction, which may generate an exception, and an exception generation detection instruction, which branches a process to an exception process when an exception occurrence condition is detected and an exception has occurred, divides the detected exception generation detection instruction into a first instruction, which detects the exception occurrence condition, and a second instruction, which branches the process to the exception process when the exception occurrence condition is detected, and establishes a dependency among the instructions, so that the process is shifted from the first instruction in the graph to the second instruction when the exception occurrence condition is detected, or so that the process is shifted from the first instruction to the exception generative instruction when an exception occurrence condition is not detected.

The graph editing unit removes from the graph order restrictions that are present before the exception generation detection instruction is divided and that concern the exception generative instruction, and order restrictions that are present before the exception generation detection instruction is divided and that precede the exception generation detection instruction. Therefore, the order restrictions for the exception generative instruction can be removed from the critical path in a predetermined area (e.g., a basic block) in the program.

Further, according to the invention, a compiler for converting the source code for a program written in a programming language into machine language and for optimizing the program comprises: an intermediate code generator for converting the source code into editable intermediate code; an optimization unit for optimizing the intermediate code; and a machine language code generator for using the obtained intermediate code to generate machine language code, wherein the optimization unit analyzes the intermediate code for the program, transforms the program, within a predetermined range, so that an exception generative instruction that may generate an exception is executed before other instructions, establishes dependencies among the instructions of the program, so that, when an exception has been generated by the exception generative instruction, following the execution of the exception generative instruction the execution of instructions is inhibited, and converts an area in the program, within a predetermined range, so that the occurrence of an exception is detected when an exception is generated by at least one of multiple exception generative instructions, and a process is shifted to a corresponding exception process.

When the exception generative instruction is accompanied by side effects, the optimization unit establishes order restrictions for the exception generative instructions in the graph, so that before the program is transformed the order restrictions concerning the side effects are stored.

BRIEF DESCRIPTION OF THE DRAWINGS

FIG. 7 is a diagram showing an example of intermediate codes and quadruple intermediate codes for a target program for this embodiment.

FIG. 10 is a diagram showing another example of the intermediate codes and quadruple intermediate codes for the program for this embodiment.

FIG. 15 is a diagram showing an example for implementing the basic operations required by the x86 architecture for the speculative execution of the iaload instruction for Java byte code.

FIG. 16 is a diagram for explaining a method for calculating the slackness of each vertex in a DAG obtained by taking into account only the data dependency and the side effects.

FIG. 17 is a diagram showing an example for implementing the basic operations required by the PowerPC architecture for the speculative execution of the iaload instruction for Java byte code.

FIG. 18 is a diagram showing an example for implementing the basic operations required by the IA-64 architecture for the speculative execution of the iaload instruction for Java byte code.

Figure 1:
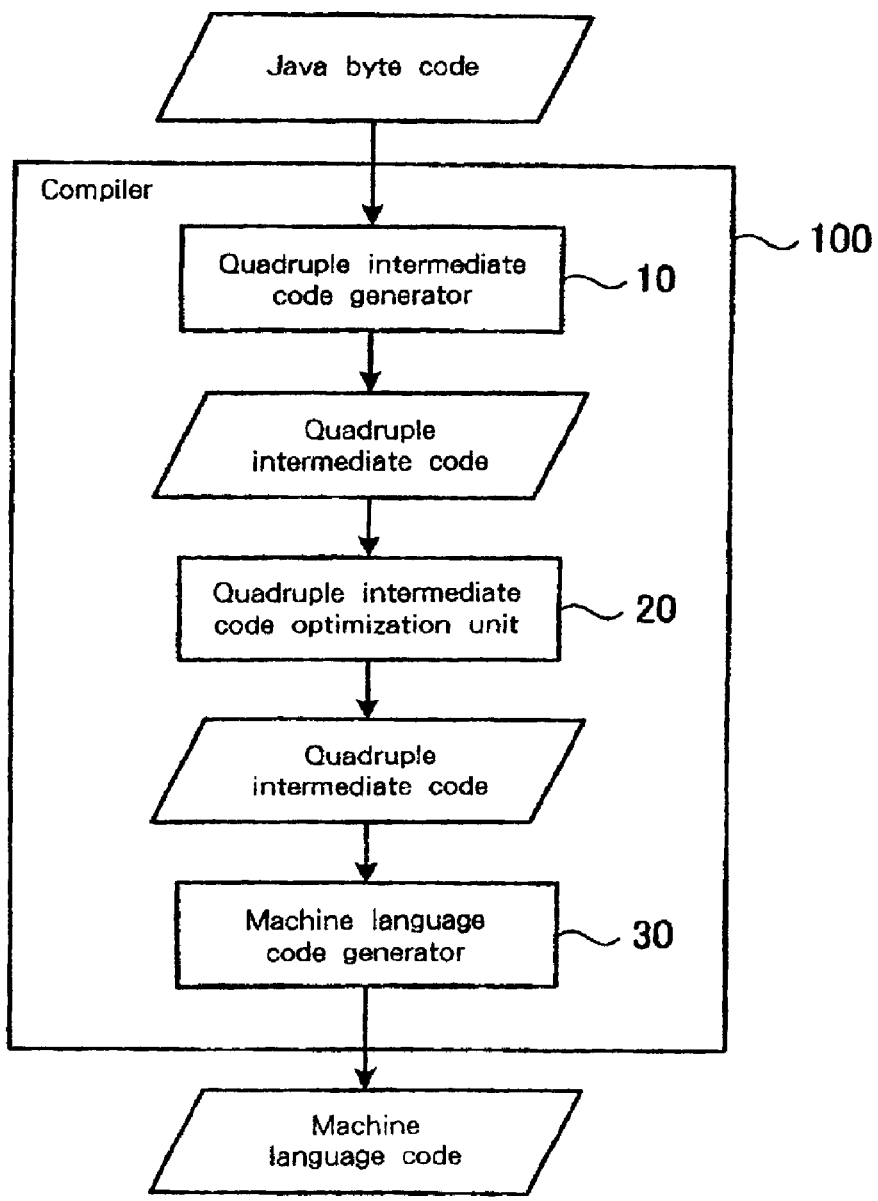
FIG. 1 is a diagram for explaining the configuration of a compiler according to one embodiment of the present invention.

For ease of reference, the following is a description of symbols used in the drawings:
10: Quadruple intermediate code generator
20: Quadruple intermediate code optimization unit
21: DAG generator
22: DAG editing unit
23: Quadruple intermediate code reproduction unit
30: Machine language code generator

DETAILED DESCRIPTION OF THE INVENTION

The preferred embodiment of this invention will now be described in detail while referring to the accompanying drawings.

First, an overview of the invention will be provided. In this invention, parallelisms of program instructions, including instructions (exception generative instructions) that may generate exceptions, are obtained by reducing, on a software basis, the preceding restrictions of exception generative instructions relative to other instructions.

In this invention, a compiler changes code, so that an exception generative instruction issued before other instructions is protected by software. Then, when an exception (speculative exception) is generated by an exception generative instruction that is executed speculatively, the process is branched to an exception handler prepared by the compiler, and the performance of necessary side effects (writing to memory) and the detection of the exception are initiated. Subsequently, a flag representing the occurrence of the exception is set, and the context of an instruction that is not protected is recovered to resume the execution. When the compiler controls the occurrence of the exception in this manner, more types of instructions can be issued in advance.

Thereafter, the setting for the flag representing the occurrence of the exception is determined for the context wherein the exception generative instruction was originally located. And after the flag has been set, the exception process inherent to the exception is performed. As is described above, since the occurrence of the speculative exception is determined by software, such as conditional branching or predicate software, the exception generative instruction can be theoretically issued in advance, without being affected by all the restrictions that include restriction by control, restriction by memory access and restriction by an exception.

However, the cost incurred when an instruction is executed to determine a speculative exception can not be ignored. Furthermore, when a speculative process is performed that is not supported by hardware, the exception determination must be performed by software, and the cost involved is increased.

Therefore, in this invention, a specific determination process is performed wherein, when even one flag is set at the head of the basic block of a program, this is collectively detected. When the flag is represented bitwise, this determination can be quickly performed by a single machine language instruction.

When, as a result of this determination, one of the flags in the basic block is set, first, a necessary and adequate instruction is executed to recover the written context of the original program. Then, the flag is detected, and an exception process corresponding to the flag is performed. It should be noted that the basic block represents the range of straight code, i.e., a code sequence that the control flow neither enters nor exits.

FIG. 1 is a diagram for explaining the configuration of a compiler according to the embodiment of the invention.

In accordance with the embodiment, an explanation will be given for an example in which Java is used as a target language for which an exception must be strictly handled. That is, a Java program is employed as a target to be optimized, and the Java's Just In Time Compiler is employed. Therefore, a compiler 100 in the embodiment in FIG. 1 compiles a received program written in Java byte code, converts the Java byte code into machine language code that corresponds to a computer that executes the Java program, and outputs the machine language code. It should be noted, however, that the invention can be applied for compilers for programs written in various other languages.

If When Java's Just In Time Compiler is employed as the compiler 100, it is mounted in a computer for the execution of the Java program. That is, the computer, which, although it is not shown, comprises an input device that receives source code for a program, a memory in which a computer program for implementing the compiler 100 is stored and a machine (CPU) that, under the control of the computer program stored in the memory, serves as the compiler 100, executes machine language code provided by the compiler 100.

The computer also includes a reception unit for retrieving the computer program for implementing the compiler 100 from a disk drive, for reading the program from a CD-ROM or a floppy disk, or for receiving the program via a network.

In FIG. 1, the compiler 100 in this embodiment includes a quadruple intermediate code generator 10, a quadruple intermediate code optimization unit 20 and a machine language code generator 30. With this configuration, the quadruple intermediate code generator 10 analyzes the program in the Java byte code form and converts it to an intermediate code represented in a quadruple form (hereinafter referred to as quadruple intermediate code). The quadruple intermediate code optimization unit 20 removes calculation redundancies, or moves the intermediate code, for the quadruple intermediate code generated by the quadruple intermediate code generator 10, so that the execution time for the finally obtained machine language code is reduced. During the optimization process, the instruction order is changed so that an exception generative instruction in the program is speculatively executed. The machine language code generator 30 converts the optimized quadruple intermediate code into a machine language code form corresponding to the CPU that executes the program, and outputs the machine language code.

In this embodiment, the focus is on the following features: the compiling of exception processes in the Java language, and the speculative execution of exception generative instructions, which is efficiently performed by software.

1. An exception process is always an exit from a control block. Further, only the results provided by side effects are detected by an exception handler defined by a user, and other, intermediate results are not referred to during the code execution that follows the processing performed by the exception handler. Therefore, when an exception occurs as the result of the speculative execution of an exception generative instruction, exact recovery of the overall operating state is not required; only the order of the side effects need be ensured and the exception type and the argument designated.
2. Since an "exceptional condition" in a program is handled for an exception, it can be assumed that overall the frequency whereat exceptions occur is comparatively low during the execution of a program. Therefore, when an exception has occurred, software overhead can be tolerated, to a degree.
3. In this invention, when a normal processor, one other than a Java chip, is employed for compiling, software overhead, due to an explicit instruction sequence, accompanies the compiling in order to detect an exception. A specific exception that appears most frequently is one (ArrayIndexOutOfBoundsException) wherein an access is detected that, due to an index, exceeds the bounds of an array. Thus, a conventional instruction for examining array size and an index variable can be employed when detecting the occurrence of a speculative exception.

With the above described characteristic in the Java language, the following basic policies are employed to use software in order to speculatively execute an exception generative instruction in Java.

1. By employing a conventional instruction sequence for detecting an exception in the Java language, the execution of a hardware exception generative instruction is protected by software using conditional branching or a predicated instruction. That is, when a hardware exception has occurred, the exception generative instruction is not executed. Therefore, additional instruction overhead need not be introduced for the execution of an instruction when an exception does not occur. Since the protected exception generative instruction has a control dependency with the protection, but does not include side effects and order restrictions for other exception generative instructions, order restrictions due to exception generative instructions can be reduced.
2. Whether an exception defined in the Java language has occurred is detected, an instruction for branching the process to an exception handler defined by a user is separated from an instruction for detecting an exception occurrence condition, and a flag representing the occurrence of the exception in a basic block is employed. Thus, actually, since the process for branching to the exception handler can be incorporated in the basic block, only one branching instruction is required for the software overhead for detecting the actual occurrence of an exception.
3. When the occurrence of an exception is detected, a compensation code is generated at the branching destination of the exception generation detection instruction (or a branching destination determined by the predicate of a negative condition for the predicated instruction). Thus, the insertion into an execution path that is normally followed can be avoided. Since an exception process is always an escape, compensation code is formed by side effects and the detection of an exception. In order to generate compensation code, side effects and order restrictions present between exception generative instructions are employed.

An explanation will now be given for the speculative execution of an exception generative instruction, the speculative execution of side effects and the generation of compensation code for this embodiment.

A program is represented as a directed acyclic graph (hereinafter referred to as a DAG) that indicates the dependencies of the operators in the program. The vertex of the DAG represents the operator, and one edge (directed edge) of the DAG represents the dependencies between the operators. There are three dependencies, as follows. Data dependency: This constitutes a condition wherein a current operator reads a value written by a preceding operator (flow dependency), the current operator writes data at the location whereat the preceding operator read data (anti dependency), and the current operator writes data in a location whereat the preceding operator wrote data (output dependency). Order restriction: This constitutes a condition wherein side effects for a current operator occur after the side effects for a preceding operator are completed. Control dependency: This constitutes a condition wherein execution of a current operator occurs only when a conditional determination obtained by a preceding operator is true.

The object of the speculative execution of an exception generative instruction is the reduction, to the extent possible, of unnecessary order restrictions present in a program and the extraction of parallelisms from between the operators in a DAG. The path followed during an operation for which the longest processing time is required is called the critical path of the graph. Therefore, the lower limit of the time required to complete the operation represented by the DAG corresponds to the length of the critical path. In this embodiment, at the vertex along the critical path of the DAG, the edge for the order restriction leading to the exception generation detection instruction and the edge for the order restriction leading away from the exception generative instruction are selected, and the graph is transformed so that the speculative execution of the exception generative instruction is initiated. Thus, since each conversion removes an order restriction, the critical path length can be reduced. When this operation is repeated along the critical path until the order restrictions for the exception generative instruction and the exception generation detection instruction are removed, the overhead for the speculative execution can be minimized and the effects can be maximized.

Figure 2:
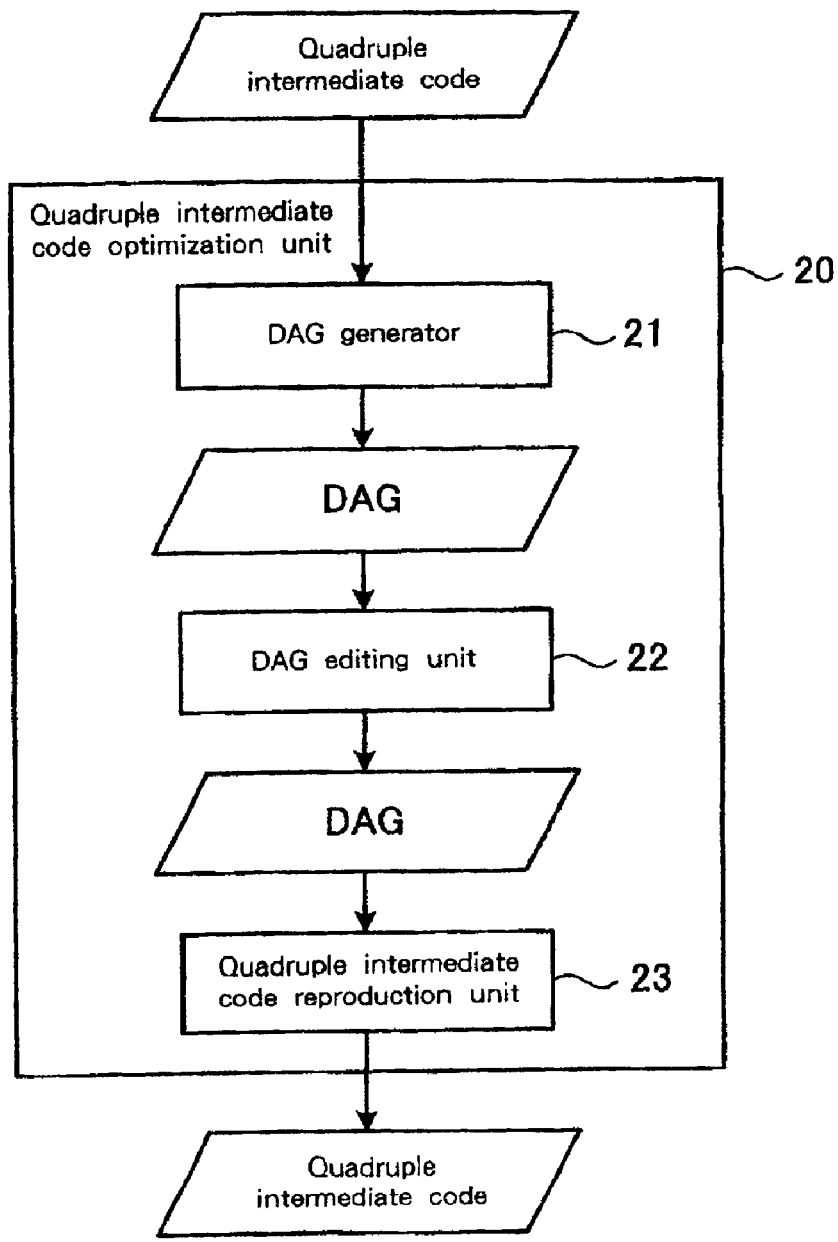
FIG. 2 is a block diagram for explaining the configuration of a quadruple intermediate code optimization unit according to the embodiment.

In this embodiment, an explanation will now be given for the quadruple intermediate code optimization unit 20 that implements the above process. FIG. 2 is a block diagram for explaining the configuration of the quadruple intermediate code optimization unit 20. In FIG. 2, the quadruple intermediate code optimization unit 20 comprises: a DAG generator 21, for converting quadruple intermediate code into a DAG (Directed Acyclic Graph); a DAG editing unit 22; and a quadruple intermediate code reproduction unit 23, for employing the DAG for the reproduction of quadruple intermediate code. The DAG generator 21 receives a quadruple intermediate code generated by the quadruple intermediate code generator 10, analyzes the data dependencies and order restrictions present between the quadruple operators, and generates a DAG that is representative of the analysis. That is, in the DAG, the quadruple intermediate code instructions in the program are defined as vertexes (nodes), and the order restrictions between the instructions are represented as directed edges (paths). The DAG editing unit 22 receives the DAG from the DAG generator 21, and edits the DAG so that the exception generative instruction can be speculatively executed. The quadruple intermediate code reproduction unit 23 receives the DAG from the DAG editing unit 22, converts the DAG to reproduce the quadruple intermediate code program, and outputs the program.

Figure 3:
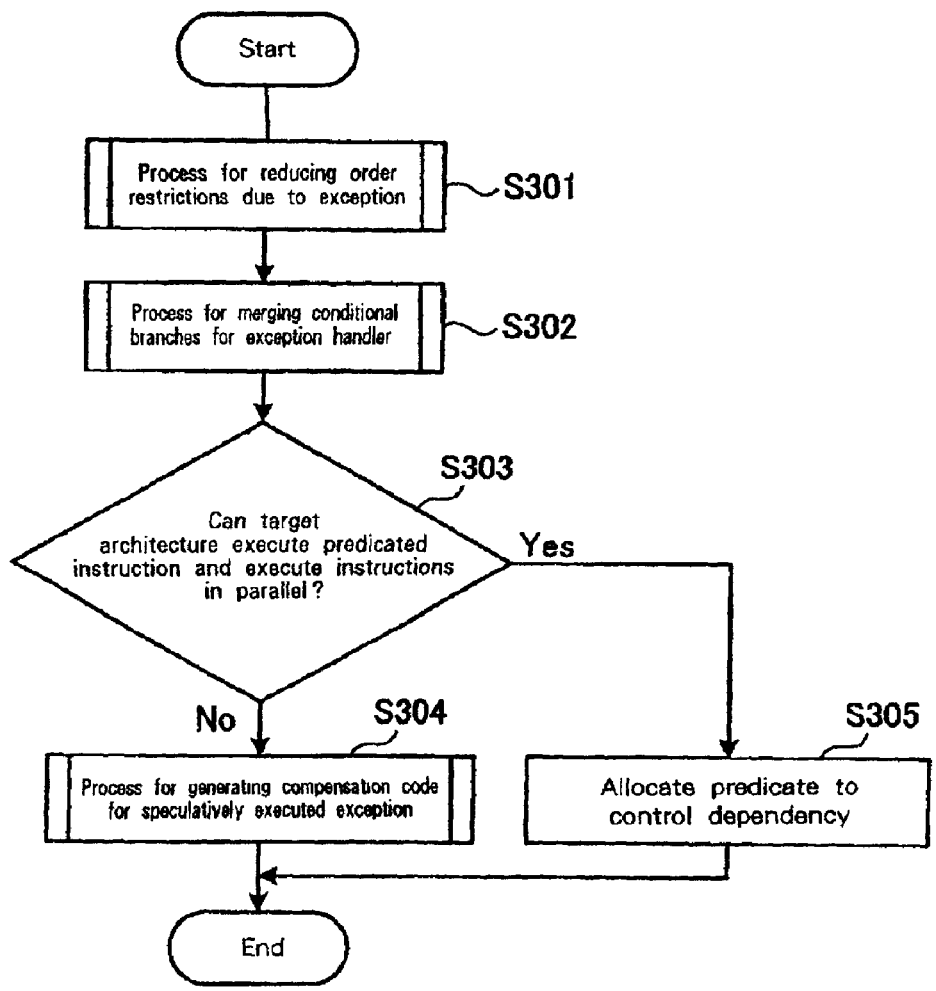
FIG. 3 is a flowchart for explaining the overall editing processing performed by a DAG editing unit according to the embodiment.

FIG. 3 is a flowchart for explaining the overall editing processing performed by the DAG editing unit 22. In FIG. 3, the DAG editing unit 22 reduces the order restrictions, which are present along the critical path of the program expressed as the DAG and that are affected by an exception (step 301). By reducing the order restrictions imposed by the exception, the exception generative instruction in the original DAG is divided into an instruction for the detection of an exception and a conditional branching instruction for an exception handler. Then, following the detection of the exception, a new control dependency is added to the exception generative instruction.

Next, for the DAG obtained by the order restriction reduction process, the DAG editing unit 22 performs a merging process for the conditional branches for the exception handler (step 302). Through this processing, continuous conditional branches for the exception handler are merged to form a single conditional branch that employs a representative flag.

The DAG editing unit 22 determines whether a machine (hereinafter referred to as a target architecture) for executing the program can execute a predicated instruction and can execute instructions in parallel (step 303). When the target architecture does not provide for the parallel execution of the predicated instruction, compensation code is generated for an exception that is speculatively executed (step 304). When the target architecture includes a function for the parallel execution of a predicated instruction, the predicate is allocated in consonance with the control dependency generated in the order restriction reduction process at step 301 (step 305). When the generation of the compensation code (step 304) or the allocation of the predicate (step 305) is completed, the processing by the DAG editing unit 22 is terminated.

Figure 4:
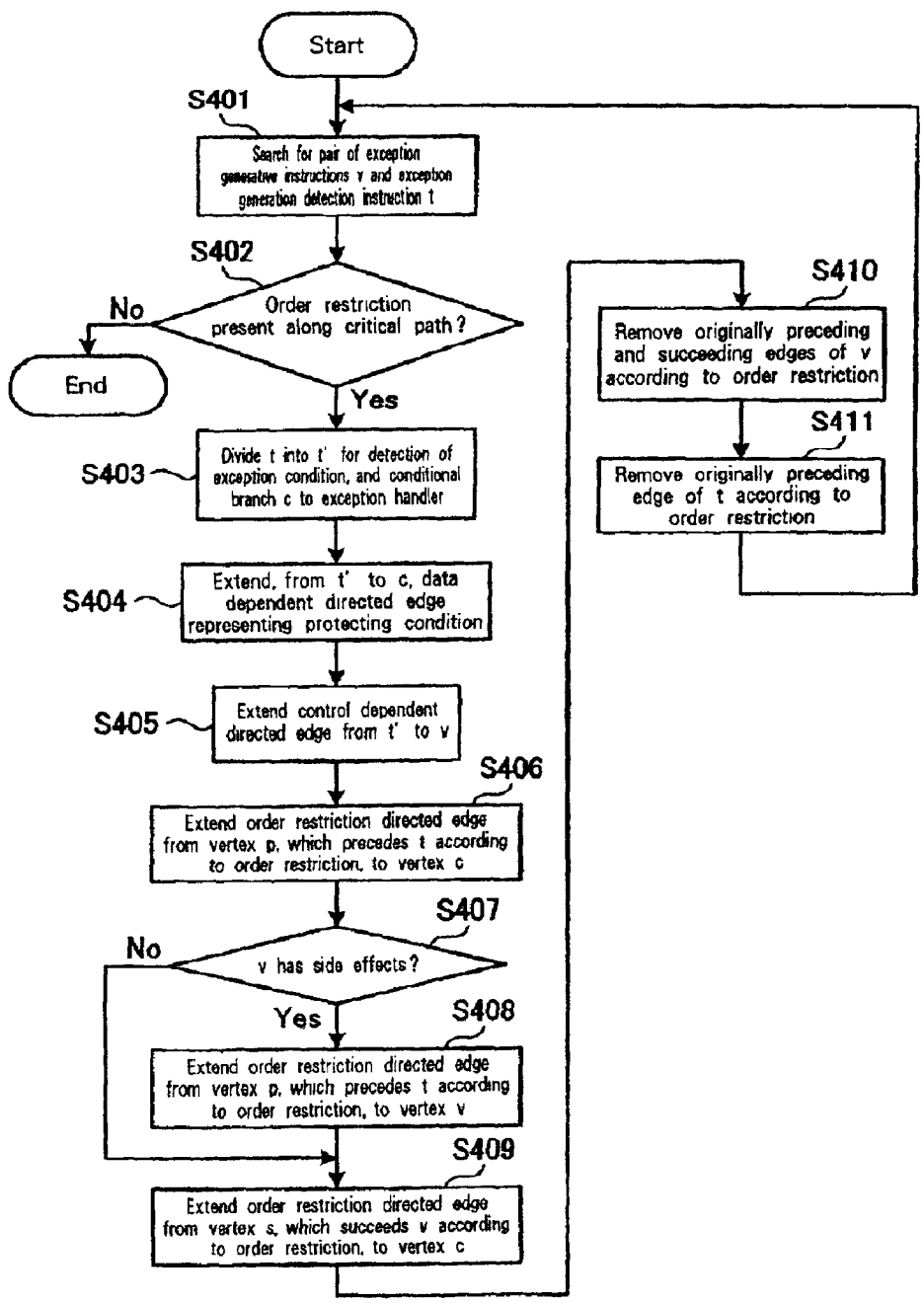
FIG. 4 is a detailed flowchart for explaining step 301 in FIG. 3 for the processing performed to reduce order restrictions due to an exception.

FIG. 4 is a detailed flowchart for explaining step 301 in FIG. 3 for the process for reducing the order restrictions imposed by the exception. In FIG. 4, during the order restriction reduction process, the DAG editing unit 22 examines the vertexes of the DAG to find a pair of exception generative instructions v having the same exception occurrence conditions and an exception generation detection instruction t (step 401). Then, the DAG editing unit 22 determines whether the order restriction for both the exception generative instructions v and the exception generation detection instruction t forms the critical path (step 402).

When the order restriction forms the critical path, i.e., when the order restriction is located along the critical path, the DAG editing unit 22 divides the original instruction t, which detects the exception occurrence condition and branches the process to the exception handler, into an instruction t', for detecting only the exception condition, and an instruction c, for actually branching the process to the exception handler (step 403).

Following this, the directed edge that represents the data dependency is extended from the vertex t' of the DAG to the vertex c (step 404). This edge represents a condition wherein the instruction c is branched under the exception occurrence condition detected by the instruction t'. Further, the directed edge representing the control dependency is extended from the vertex t' to the vertex v (step 405). This edge represents a condition wherein the instruction v is executed only when it is confirmed that the exception did not occur due to the instruction t'. The directed edge representing the order restriction is extended from the preceding vertex p of the vertex t, according to the order restriction, to the vertex c (step 406). This edge represents a condition wherein the conditional branching at the instruction c is performed after all the side effects preceding the instruction t in the original program are completed.

Next, the DAG editing unit 22 determines whether the instruction v has side effects, i.e., whether the writing of the data to the memory should be performed (step 407). When the instruction v has side effects, the DAG editing unit 22 extends the directed edge for the order restriction from the vertex p, which precedes the vertex t according to the order restriction in the DAG, to the vertex v (step 408). This edge represents a condition wherein the order restrictions between the side effects of the original program are maintained even during the conversion.

When the instruction v does not have side effects and when step 408 is completed, the DAG editing unit 22 extends the directed edge for the order restriction from the vertex c to the succeeding vertex s of the vertex v according to the order restriction for of the DAG (step 409). This edge represents the condition wherein the succeeding order restriction for the original instruction v is guaranteed when the instruction c is executed.

Then, the DAG editing unit 22 removes the original preceding or succeeding edges (except for the edge introduced at step 408) of the vertex v according to the order restrictions in the DAG (step 410). Similarly, the preceding edge of the vertex t according to the order restriction is removed (step 411). Through this processing, the order restriction for the exception generative instruction can be removed from the critical path. When the process at step 411 is completed, the DAG editing unit 22 returns to step 401, and searches for the order restriction for the next exception generative instruction along the critical path. When no more order restrictions are present along the critical path, the order restriction reduction process due to the exception is terminated (step 402).

Figure 5:
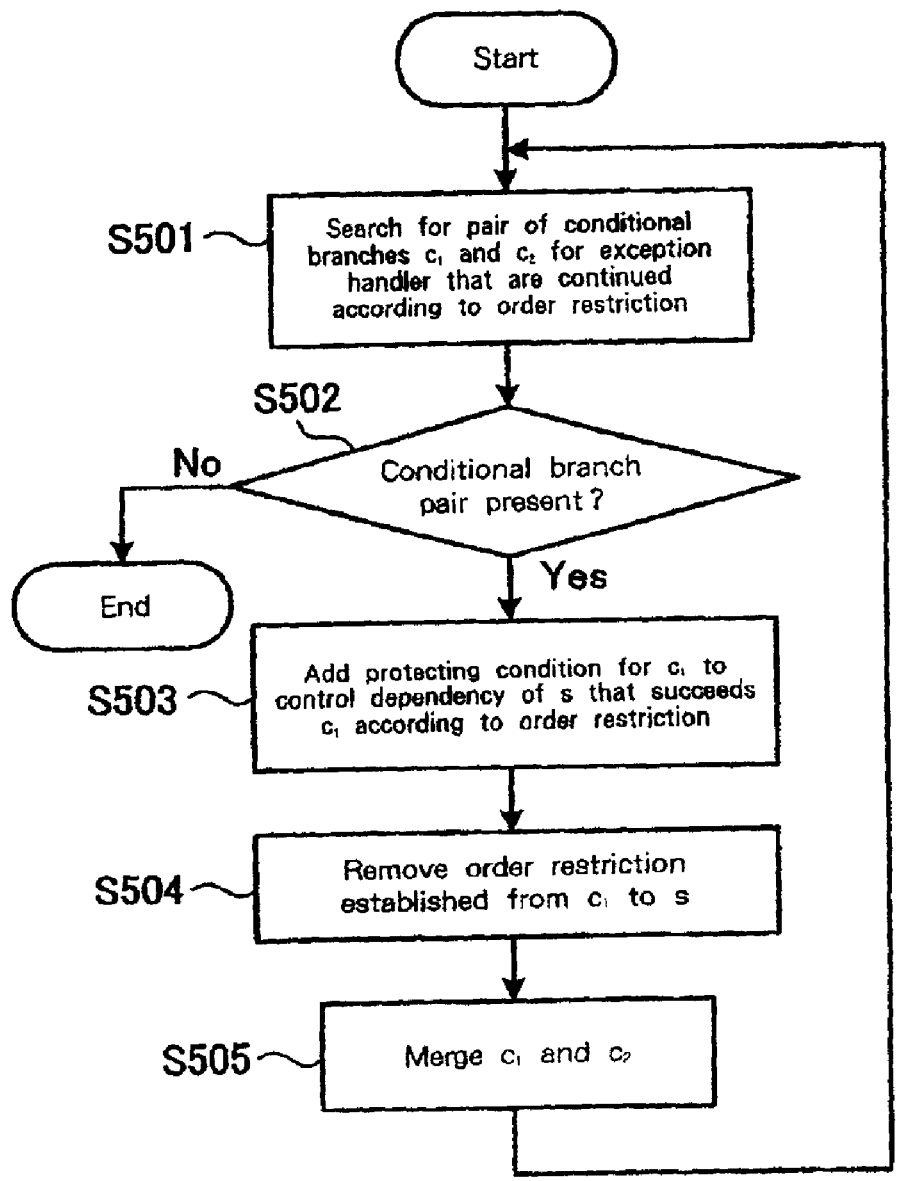
FIG. 5 is a detailed flowchart for explaining step 302 in FIG. 3 for the processing performed for merging conditional branches for an exception handler.

FIG. 5 is a detailed flowchart for explaining step 302 in FIG. 3 for the process for merging the conditional branches for the exception handler. In FIG. 5, in the process for merging the conditional branches for the exception handler, first, the DAG editing unit 22 examines the DAG obtained by the order restriction reduction process to find a pair of conditional branches $c_1$ and $c_2$ for the exception handler that are connected by the order restriction edge (step 501), and determines whether such a pair is present (step 502).

When the pair of conditional branches $c_1$ and $c_2$ is present, by using the logical sum, the DAG editing unit 22 adds the protection condition of the conditional branch $c_1$ to the control dependency of the succeeding vertex s of the conditional branch $c_1$, according to the order restriction of the DAG (step 503). The added control dependency represents a condition wherein the instruction s is executed only when both the condition examined at the conditional branch $c_1$ and the original condition for the execution of the instruction s have been established.

Next, the DAG editing unit 22 removes the order restriction for the vertex s from the conditional branch $c_1$ of the DAG (step 504), and merges the conditional branches $c_1$ and $c_2$ (step 505). At the conditional branch $c_2$, the original conditional branch $c_1$ and the conditional branch $c_2$ are examined. When the process at step 505 has been completed, the DAG editing unit 22 returns to step 501 and searches for the pair of conditional branches $c_1$ and $c_2$ for the exception handler that are connected by the order restriction edge. When such a pair is not present, the process for merging the conditional branches for the exception handler is terminated (step 502).

Figure 6:
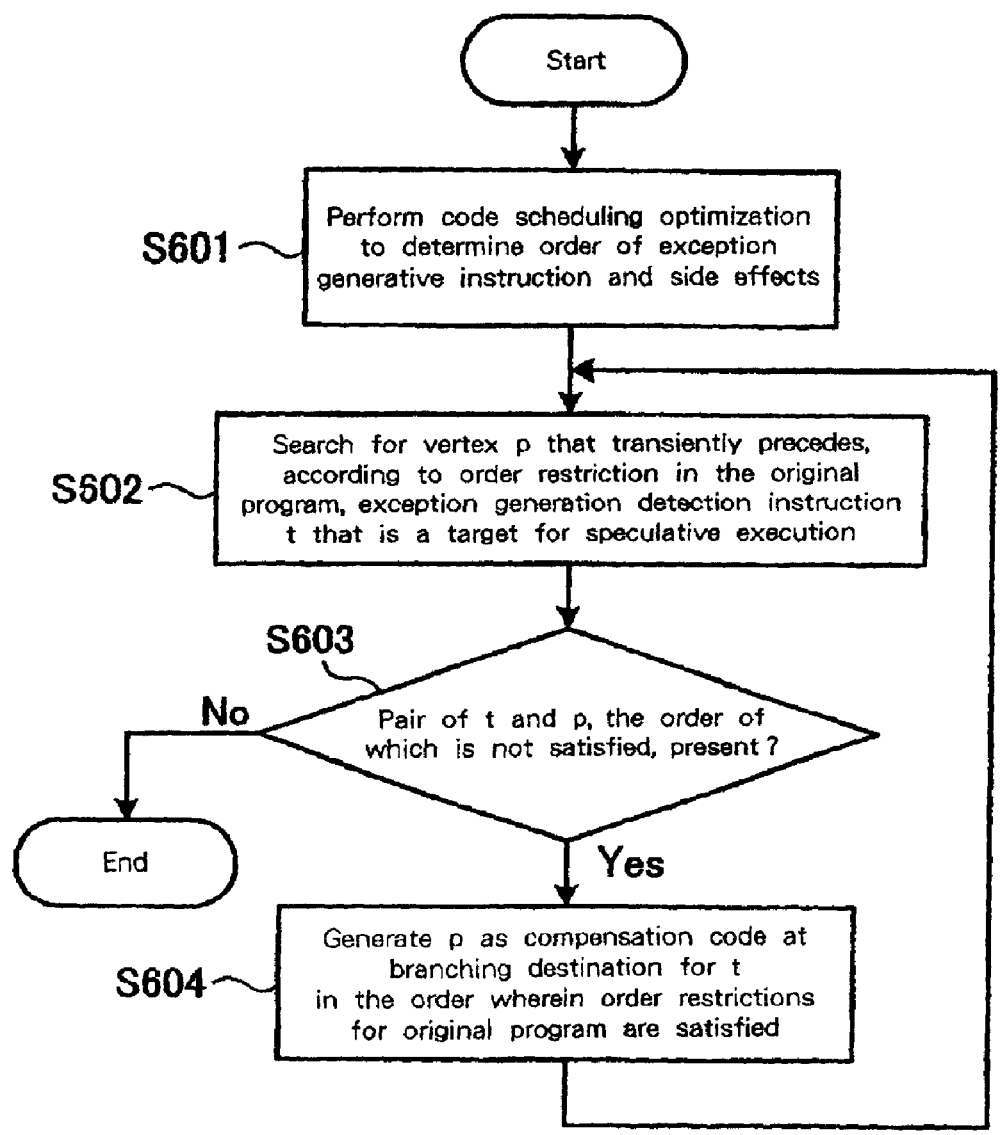
FIG. 6 is a detailed flowchart for explaining step 304 in FIG. 3 for the processing performed to generate compensation code relative to a speculatively executed exception.

FIG. 6 is a detailed flowchart for explaining step 304 in FIG. 3 for the process for generating the compensation code for the exception that is speculatively executed. During the process in FIG. 6, the DAG editing unit 22 first performs code scheduling optimization processing and determines the order between the exception generative instruction and the side effects in the DAG (step 601). During the code scheduling optimization processing, the optimal order is provided for the vertexes of the DAG, while taking into account the delay time for the operator and the usage status of the available resources for the target machine.

The DAG editing unit 22 examines the vertexes of the DAG that are determined in order to find a vertex p that precedes, along the time axis in the original program, the exception generation detection instruction t, which was a target for speculative execution during the order restriction reduction process (see step 301 in FIG. 3 and FIG. 4) (step 602).

Then, the DAG editing unit 22 determines whether, because of the order provided by the code scheduling optimization processing at step 601, there is a pair of vertexes t and p in the DAG obtained at step 602, for which the order restriction of the original program can not be maintained (step 603).

If there is a pair of vertexes t and p for which the order restriction in the original program can not be maintained, the DAG editing unit 22 generates an instruction p as compensation code at the branch destination of the instruction t, generated as a conditional branch (step 604). When multiple vertexes p precede the vertex t in the DAG, the compensation code is generated at the branching destination of each vertex p from the instruction t in the order whereat the order restriction of the original program is satisfied. When the process at step 604 is completed, the DAG editing unit 22 returns to step 602, and searches for the pair of vertexes t and p for which the next order restriction is not satisfied in the DAG. If no such a pair is present, the generation of compensation code for the speculative executed exception is terminated (step 603).

When the DAG editing unit 22 has edited the DAG in the above described manner, the quadruple intermediate reproduction unit 23 employs the obtained DAG to the produce quadruple intermediate code. Then, the machine language code generator 30 converts the optimized quadruple intermediate code into machine language code that corresponds to the target architecture, and the coupling process is thereafter terminated.

Figure 8:
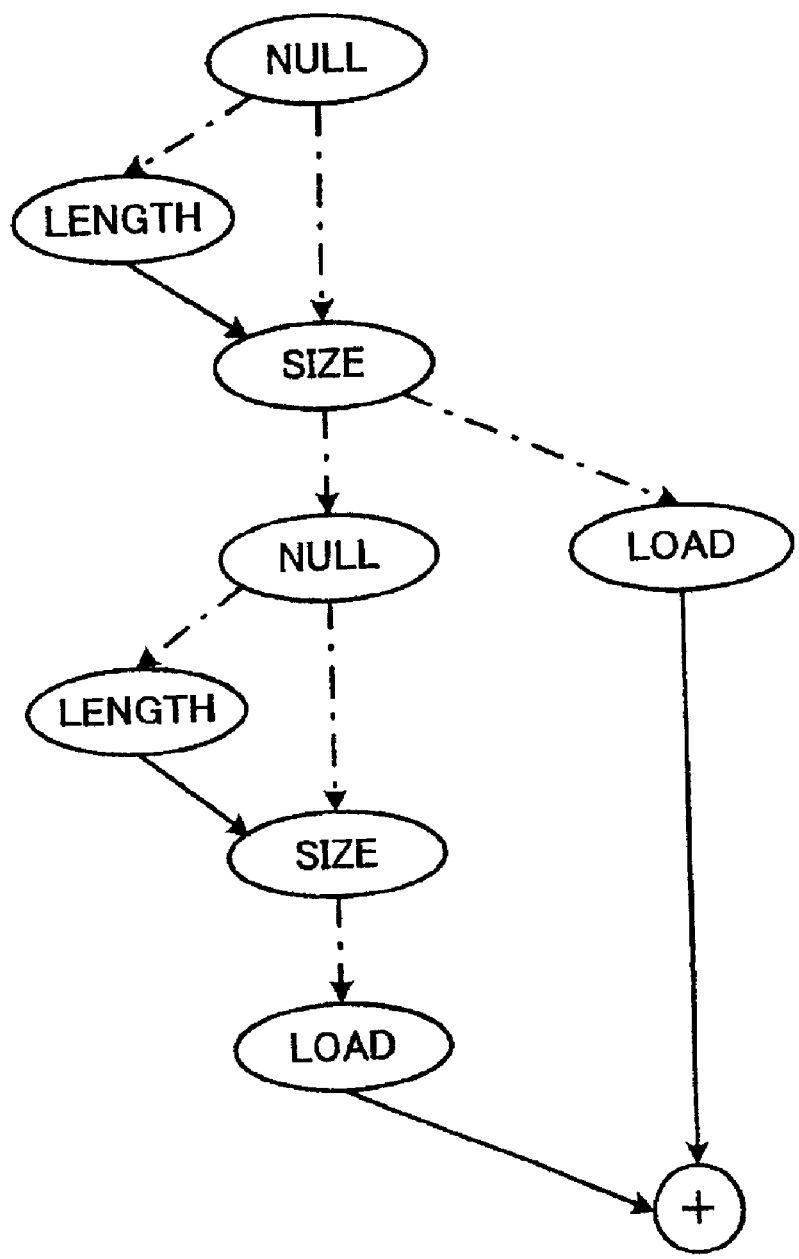
FIG. 8 is a diagram showing a DAG representing the restrictions of the program in FIG. 7.

An explanation will now be given for a specific operation for optimizing intermediate code in a Java program. The optimization of the intermediate code for a Java program shown in FIG. 7A is employed as an example. Assuming the platform whereon the software is employed to examine NullPointerException, the quadruple intermediate code corresponding to this program is represented as is shown in FIG. 7B. In FIGS. 7A and 7B, Null denotes an operation for detecting NullPointerException for an array, LENGTH denotes an operation for obtaining the length of the array, and SIZE denotes the operation for detecting ArrayIndexOutOfBoundsException. FIG. 8 is a diagram showing the state wherein the DAG generator 21 of the quadruple intermediate code optimization unit 20 uses the DAG to express the restrictions of the program.

Then, the DAG editing unit 22 of the quadruple intermediate code optimization unit 20 edits the DAG in FIG. 8. When, for simplification of the explanation, the cost required for all the operations in the DAG in FIG. 8 is 1, the critical path length of the graph is eight cycles. Since the SIZE instruction and the NULL instruction change the control, the order restriction is established from the SIZE instruction to the NULL instruction. Thus, the LENGTH, SIZE and LOAD depending on the NULL instruction have the dependency to the SIZE instruction, so that the original critical path length is extended due to the data dependency.

First, in the order restriction reduction process (see step 301 in FIG. 3 and FIG. 4), the restriction is reduced by speculatively executing the NULL instruction. The operation of the original NULL instruction includes the detection of the occurrence of an exception and the branching to the exception handler. This NULL instruction is divided into the detection of the exception occurrence condition (represented by the same NULL instruction) and the branching to the exception process routine (CHECK instruction). Upon the detection of the exception occurrence condition, the exception generation detection instruction (NULL) sets the representative flag that indicates the occurrence of an exception in the basic block. The instruction for branching to the exception process routine (CHECK) examines the representative flag, and if the exception has occurred, branches the process for the exception handler that is supposed to occur first in the original program. Since the representative flag is employed for the processing, only one instruction is required to detect the occurrence of multiple exceptions. The LENGTH instruction, which is an exception generative instruction, is protected by the exception generation detection instruction (NULL). That is, when the NULL instruction detects the exception occurrence condition, the LENGTH instruction is not executed. The order restriction imposed by the SIZE instruction preceding the NULL instruction can be removed by separating the branch for the exception handler from the original NULL instruction. The other operations that employ the value of the exception generative instruction need not be protected so long as they are not exception generative instructions or side effects. This is because only side effects and the occurrence of an exception are observed by the exception handler.

Figure 9:
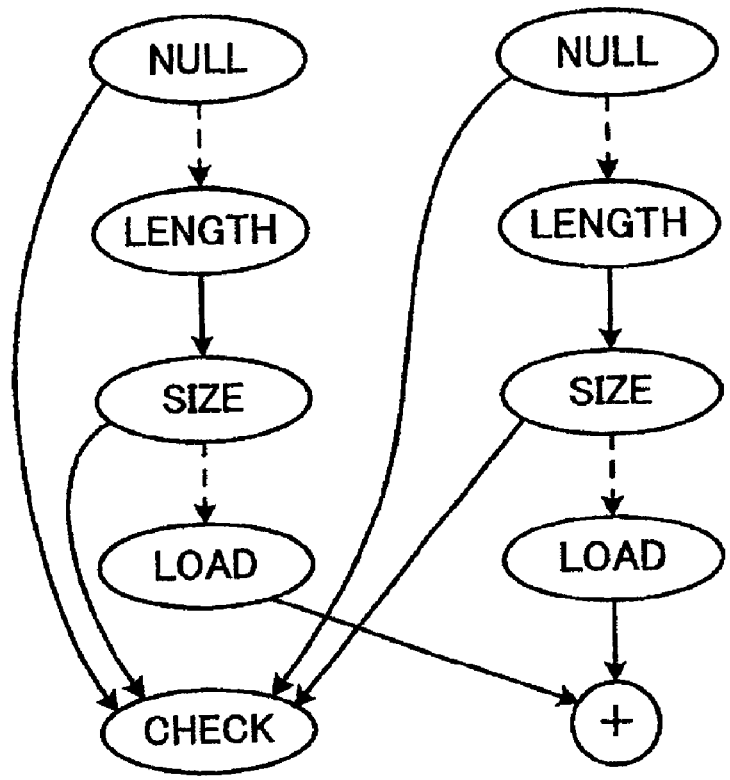
FIG. 9 is a diagram showing a DAG obtained by editing the DAG in FIG. 8.

FIG. 9 is a diagram showing the DAG obtained by also employing the above transformation for the following SIZE instruction, and performing the process for merging the conditional branches for the exception handler (see step 302 in FIG. 3 and FIG. 5). When the DAGs in FIGS. 8 and 9 are compared, the critical path length of the DAG in FIG. 8 is eight cycles, while since one CHECK instruction is added in the above process, the critical path length in FIG. 9 is reduced to five cycles.

In FIGS. 8 and 9, a data dependency is indicated by a solid-line arrow, an order restriction is indicated by a chain-line arrow, and a control dependency is indicated by a broken-line arrow. This is also applied for FIGS. 11 and 12, which will be referred to later.

Figure 11:
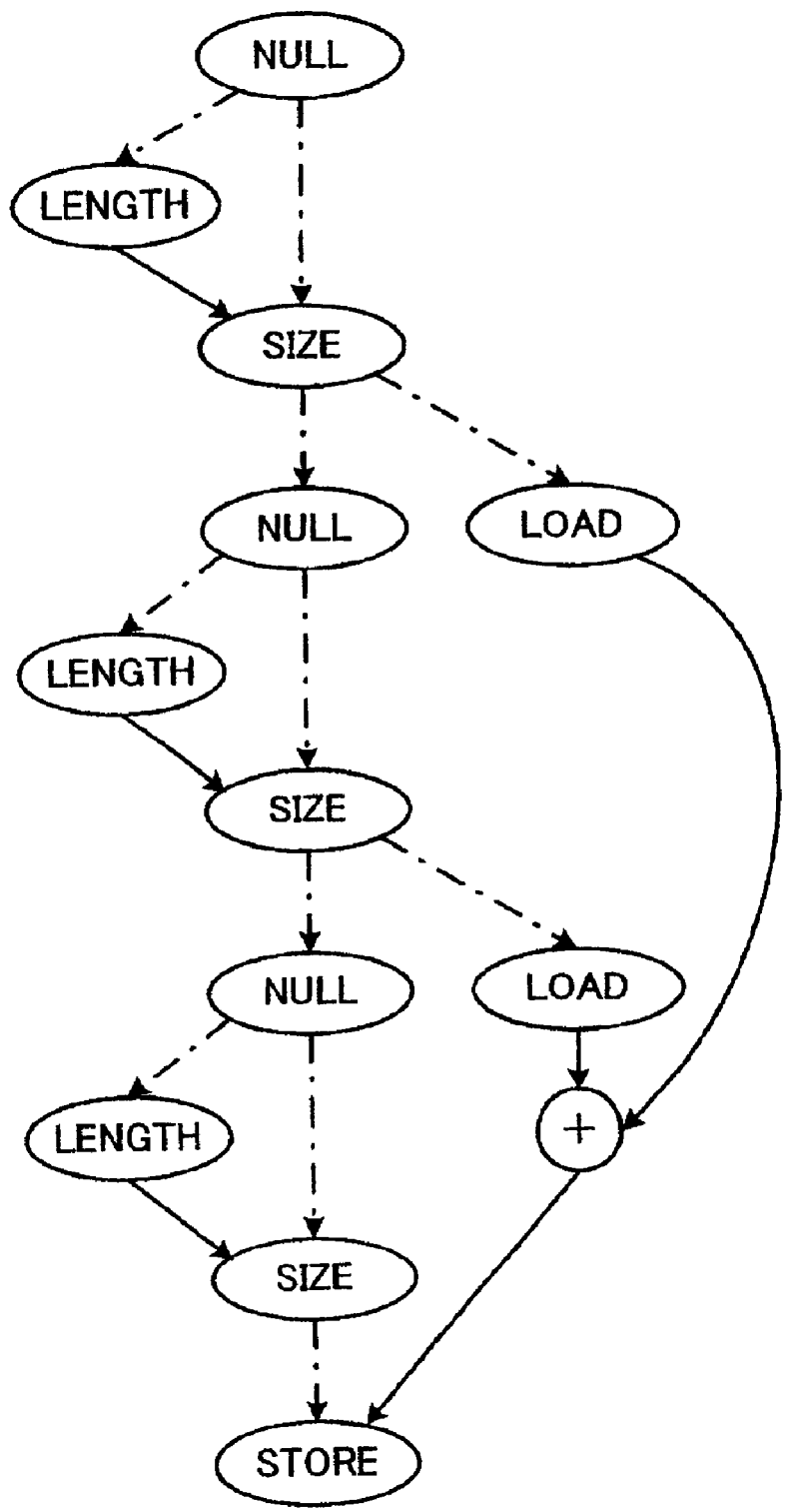
FIG. 11 is a diagram showing a DAG representing the restrictions of the program in FIG. 10.

An explanation will now be given for a specific example of the speculative execution of an exception generative instruction that is accompanied by side effects. In this case, the exception generative instruction must be protected not only by the condition for the immediately preceding exception generation detection instruction, but also by the condition for all the preceding exception generation detection instructions. As an example, the optimization for the intermediate code of a Java program shown in FIG. 10 is employed. Assuming the platform whereon the software is employed to check NullPointerException, the quadruple intermediate code corresponding to this program is obtained as shown in FIG. 10B. FIG. 11 is a diagram showing the state wherein the DAG generator 21 of the quadruple intermediate code optimization unit 20 employs the DAG to express the restrictions of the program.

Then, the DAG editing unit 22 of the quadruple intermediate code optimization unit 20 edits the DAG in FIG. 11. When the cost required for all the operations in the DAG in FIG. 11 is 1, the critical path length of the graph is ten cycles. When the third SIZE instruction is speculatively executed, the side effects due to the STORE instruction must be protected by using the product of the conditions in all the exception generation detection instructions that precede the STORE instruction.

Figure 12:
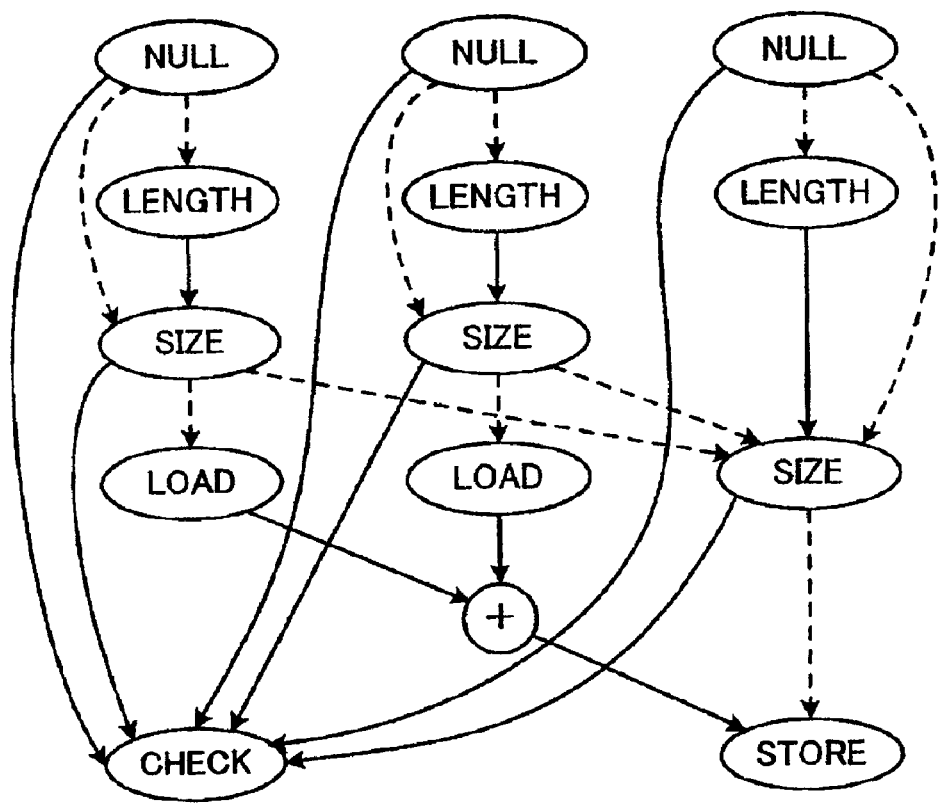
FIG. 12 is a diagram showing a DAG obtained by editing the DAG in FIG. 11.

FIG. 12 is a diagram showing a DAG obtained by performing the order restriction reduction process (see step 301 in FIG. 3 and FIG. 4) and the conditional branches merging process (see step 302 in FIG. 3 and FIG. 5) for the DAG in FIG. 11. When the DAGs in FIGS. 11 and 12 are compared, the critical path length of the DAG in FIG. 11 is ten cycles, and the critical path length in FIG. 12 is reduced to six cycles by adding the CHECK instruction in the above process.

An explanation will now be given for a specific example of the generation of compensation code when the occurrence of an exception is detected. As is described above, when an exception has occurred, the side effects and the exception that are executed before the exception generative instruction in the original program must be detected. For an architecture, such as the IA-64, that can execute a predicated instruction, when the control dependency of the exception generation detection instruction on the exception generative instruction and the side effects is implemented with a predicate, the compensation code is not required. In this case, for the testing of the representative flag, of the multiple exceptions that have occurred in the basic block, the process need only be branched for the exception handler, of the first exception generation detection instruction in the original program.

For an architecture that can not execute a predicated instruction, due to the conditional branching, protection is implemented using the exception generation detection instruction. Thus, compensation code for the execution of necessary side effects and the detection of an exception must be generated at the branching destination when the occurrence of the exception is detected (see step 304 in FIG. 3 and FIG. 6). The compensation code is obtained after the code scheduling optimization has been terminated and the order of the operations is determined.

Figure 13:
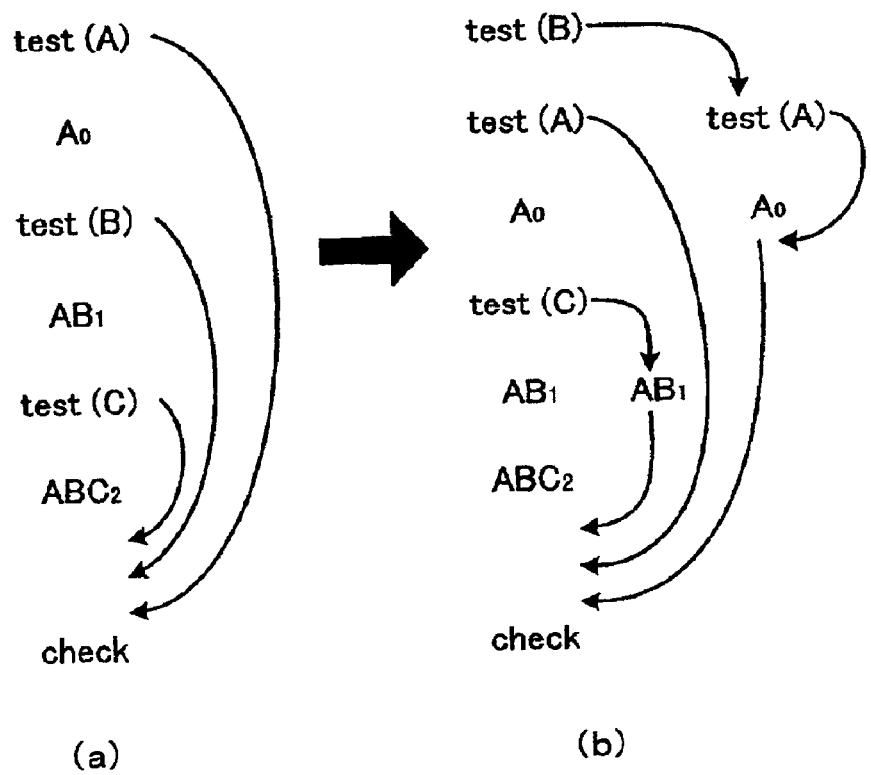
FIG. 13 is a diagram for explaining necessary compensation codes for predetermined codes.
Figure 14:
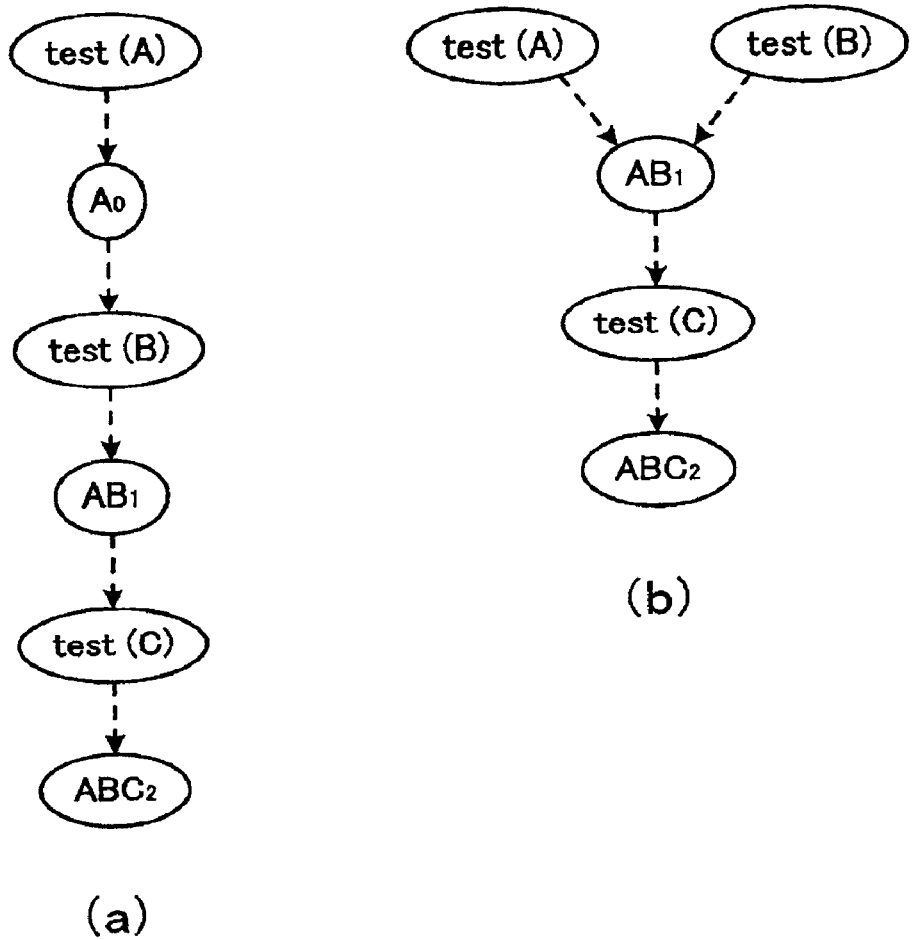
FIG. 14 is a diagram showing the order restrictions for the codes in FIG. 13.

FIG. 13 is a diagram for explaining the state (FIG. 13B) wherein necessary compensation codes are generated for predetermined code (FIG. 13A). FIG. 14 is a diagram showing the order restrictions for the codes in FIG. 13. In FIG. 13, a "test" represents the exception generation detection instruction, and the alphabetical characters between the "tests" represent the operation providing the side effects. The above described transient control dependency is present between the side effects and the exception generation detection instruction. That is, side effect $AB_1$ can not be executed before test (A) and test (B).

If the instructions are executed in the order of the exception generation detection instruction and the side effects shown in FIG. 13A, compensation code is not required. That is, the conditional branch must be generated from the exception generation detection instruction, so as to skip all the protected operations. Whereas, when the exception generation detection instructions and the side effects are arranged as is shown in FIG. 13B by the code scheduling optimization, the simple relationship that is shown in FIG. 13A is not established between the exception generation detection instruction and the side effect. That is, compensation code required for the path from which the occurrence of the exception is detected must be executed when the order restrictions of the exception and side effects of the original code in FIG. 14A are traced backward. However, actually, the compensation code is not executed until the exception is detected, and is also not executed even after the process is recovered from the branch for the exception generation detection instruction.

When, for example, an exception is detected at test(B), test(A) and $A_0$ are currently not executed. According to the original code in FIG. 13A, the side effect $A_0$ is executed when the exception does not occur at test(A), and as is shown in FIG. 13B the code for protecting the side effect $A_0$ is inserted at test(A). Similarly, when the exception is detected at test(c), the side effect $AB_1$ is currently not executed, so that the side effect $AB_1$ is generated as compensation code, as is shown in FIG. 13B.

If the exceptions generated at test(A) and test(B) can not be distinguished by the exception handler, the number of compensation codes can be reduced. For example, when the side effect does not occur at $A_0$ in the original code in FIG. 13A and the same type of exception has occurred at test(A) and test(B), the obtained order restrictions are as shown in FIG. 14B. In this case, since the side effect $A_0$ is not present even when the codes are arranged in the order shown in FIG. 13B, it is not necessary for the occurrence of the exception at test(A) to be detected using the compensation code at test(B).

An explanation will now be given for a code generation example corresponding to several types of target architectures (machines for executing a program) using the embodiment. First, code generation for x86 architectures (the 8086, 80286 and 80386 architectures of the processors by Intel Corp.) will be explained.

The x86 architecture does not have a user-defined flag register and a predicate. For Win32, OS/2 and Linux, which are the main operating systems employed for the x86 architecture, since read and write protection is set for pages beginning at address 0 in a virtual memory, the determination of NullPointerException in the Java language can be performed by an exception handler for a hardware access violation exception. Therefore, when an exception generative instruction is not speculatively executed, code generation is not actually required for an instruction for the detection of NullPointerException.

When software speculative execution is to be performed, the exception generative instruction must be protected, so that an instruction corresponding to the NullPointerException detection instruction must be clearly generated. When the Win32 platform is employed, the basic operation required for the speculative execution of an iaload instruction for the Java byte code is implemented as is shown in FIG. 15. In FIG. 15, arrh is a register for storing the header of an array object, and idx is a register for storing the value of the subscript of an array access. eHandler is the original entry of the exception handler, and f1Handler is the head of code for executing compensation code and setting a representative flag. se1Handler is the head of code for examining the first occurring exception, and for branching the process to the original eHandler.

When the basic operation required for the speculative execution of the iaload instruction is implemented as is shown in FIG. 15, this means that the critical path length will be extended by the speculative execution when the memory access instruction that is speculatively executed is located along the critical path of the DAG formed by taking into account only the data dependency and the side effects.

To avoid this problem, the following method is employed. Specifically, the slackness is calculated for each vertex of the DAG obtained by taking into account only the data dependency and the side effects. The slackness is a numerical value representing the number of cycles for an operation that can be inserted into the path including the pertinent vertex without increasing the overall critical path length. For the selection of the exception generative instruction for the speculative execution, if the slackness is smaller than the cost for the conditional branching instruction, the speculative execution of the exception generative instruction is not performed. The slackness for each vertex is calculated as is shown in FIG. 16.

Next, code generation for the PowerPC architecture (the architecture for the PowerPC, a CPU developed by IBM Corp., Apple Computer Inc. and Motorola Corp.) will now be described.

The PowerPC architecture has a special conditional register for storing a branching condition. When the method of this embodiment is employed in the same manner as for the code generation of the x86 architecture, the code scheduler can employ parallelisms of the comparison of the exception generation detection instructions and the normal calculation. In the PowerPC architecture, the branching instruction is processed by an instruction fetching unit when a latency of three or more cycles is provided between the comparison operation and the branching instruction. Thus, in appearance the overhead of the branching instruction is 0 (0 cycle branch). Therefore, when the parallelism between the exception generative instruction and the exception generation detection instruction is extracted, the filling ratio of the operation pipeline can be increased without increasing the critical path length. And when the AIX (UNIX of IBM) platform is employed, the basic operation required for the speculative execution of the iaload instruction for the Java byte code is implemented as is shown in FIG. 17. In FIG. 17, the definitions of arrh, f1Handler, se1Handler and idx are the same as those in FIG. 15 for the x86architecture, while len is a register for storing the length of an array.

The code generation for the IA-64 architecture will now be explained. The IA-64 architecture has a predicated instruction format. Thus, an instruction is protected with a predicate, and is executed in accordance with whether the predicate is true or false. Therefore, when the protected DAG is implemented with the predicate, the generation of compensation code is not required, even upon the occurrence of an exception, and code scheduling and code generation can be directly performed for code implemented with the predicate. When the WIN64 platform is employed, the basic operation required for the speculative execution of the iaload instruction for the Java byte code is implemented as is shown in FIG. 18.

In FIG. 18, the definitions for arrh, idx, eHandler and se1Handler are the same as those in FIG. 15 for the x86 architecture, while len is the same as in FIG. 17 for the PowerPC architecture. The logical sum of the predicates can be obtained by using parallel comparison, without being accompanied by an extra instruction overhead.

As is described above, the speculative execution of the exception generative instruction, which conventionally requires hardware support, can be implemented by using the software in this embodiment. Therefore, the order restrictions that disrupt the code scheduler during the extraction of the parallelisms of the instructions can be removed for a language, such as the Java, for which the order restrictions for the exception generative instructions are strict.

Further, as is described above, when the method of this embodiment is implemented in a processor that does not have a predicate, only two instructions for conditional branching for an exception handler need be added for basic block, so that the speculative execution of the exception generative instruction can be implemented without any additional overhead for an exception generation detection instruction.

According to the invention, it should be understood that, since the preceding restriction of the exception generative instruction relative to the other instructions is reduced by using software, the speculative execution of an exception generative instruction can be implemented, and parallelisms of the instructions of a program, including exception generative instructions, can be effectively obtained.

While the present invention has been described with reference to preferred embodiments thereof, numerous obvious changes and variations may readily be made by persons skilled in the field of computer science. Accordingly, the invention should be understood to include all such variations to the full extent embraced by the claims.

What is claimed is:

1. A program optimization method for converting program source code written in a programming language into machine language comprising the steps of:

analyzing a target program and detecting exception generative instructions, which may generate an exception, and exception generation detection instructions, which branches a process to an exception process when an exception occurrence condition is detected and an exception has occurred;

dividing said exception generation detection instructions into first instructions, for the detection of exception occurrence conditions, and second instructions, for branching processes to exception processes when said exception occurrence conditions are detected;

establishing dependencies among program instructions, so that when one of said exception occurrence conditions is detected the process is shifted from a first instruction to a second instruction, and so that when none of said exception occurrence conditions are detected the process is shifted from a first instruction to an exception generative instruction; and generating compensation codes for each exception generation detection instruction.

2. The program optimization method according to claim 1, following said step for establishing said dependencies among the instructions, further comprising a step of:

collecting multiple second instructions obtained based on multiple exception generation detection instructions detected within a predetermined range of said program wherein a determination is performed based on the detection of said exception occurrence conditions by multiple first instructions, which are obtained based on multiple exception generation detection instructions.

3. The program optimization method according to claim 2, wherein said step of dividing said exception generation detection instructions includes a step of:

generating flag setting instructions, as said first instructions, when said exception occurrence conditions are detected; and wherein said step of collecting said second instructions includes a step of:

detecting the occurrence of exceptions, when flags are set for at least one of said multiple first instructions obtained based on said multiple exception generation detection instructions, and generating instructions for shifting processes so that said first instructions exchange positions with said second instructions.

4. The program optimization method according to claim 1, following said step of detecting said exception generative instruction, further comprising a step of:

generating compensation code, when an exception generative instruction is accompanied by side effects, for maintaining order restrictions that are present before said exception generation detection instruction is divided and that concern said side effects.

5. The program optimization method according to claim 1, following said step of setting said dependencies for the instruction, further comprising a step of:

defining said first instruction as a conditional branch and allocating a predicate so as to reflect said conditional branch.

6. The program optimization method according to claim 1, following said step of setting said dependencies for the instructions, further comprising a step of:

defining a first instruction as a conditional branch, and according to the result of code scheduling, generating a compensation code at a branching destination for said first instruction, so as to establish said order restrictions concerning said exception generation detection instruction before said exception generation detection instruction is divided into said first and said second instructions.

7. A compiler for converting the source code for a program written in a programming language into machine language and for optimizing said program comprising:

a graph generator for analyzing a target program and for generating a graph showing the dependencies of operations in said program;

a graph editing unit for editing said graph and for reducing order restrictions imposed on said operations due to the occurrence of an exception; and a code reproduction unit for generating program code that reflects said dependencies of said operations of said edited graph;

wherein said graph editing unit detects an exception generative instruction, which may generate an exception, and an exception generation detection instruction, which branches a process to an exception process when an exception occurrence condition is detected and an exception has occurred, divides said detected exception generation detection instruction into a first instruction, which detects said exception occurrence condition, and a second instruction, which branches said process to said exception process when said exception occurrence condition is detected, and establishes a dependency among the instructions, so that the process is shifted from said first instruction in said graph to said second instruction when said exception occurrence condition is detected, or so that the process is shifted from said first instruction to said exception generative instruction when an exception occurrence condition is not detected and wherein the compiler comprises an exception handler with compensation codes for each exception generation detection instruction.

8. The compiler according to claim 7, wherein said graph editing unit removes from said graph order restrictions that are present before said exception generation detection instruction is divided and that concern said exception generative instruction, and order restrictions that are present before said exception generation detection instruction is divided and that precede said exception generation detection instruction.

9. The compiler according to claim 7, wherein said graph editing unit synthesizes said multiple second instructions obtained based on said multiple exception generation detection instructions in said graph within a predetermined range of said program.

10. The compiler according to claim 7, wherein said graph editing unit sets order restrictions for said exception generative instruction in said graph, so that, when an exception generative instruction is accompanied by side effects, said order restrictions are maintained that are present before said exception generation detection instruction is divided and that concern said side effects.

11. The compiler according to claim 7, wherein said graph editing unit defines a first instruction as a conditional branch, and generates a compensation code at a branching destination for said first instruction, so as to establish said order restrictions concerning said exception generation detection instruction before said exception generation detection instruction is divided into said first and said second instructions.

12. A compiler for converting the source code for a program written in a programming language into machine language and for optimizing the program comprising:

an intermediate code generator for converting said source code into editable intermediate code;

an optimization unit for optimizing said intermediate code; and a machine language code generator for using said obtained intermediate code to generate machine language code, wherein said optimization unit analyzes said intermediate code for said program, transforms said program, within a predetermined range, so that an exception generative instruction that may generate an exception is executed before other instructions, establishes dependencies among the instructions of said program, so that, when an exception has been generated by said exception generative instruction, following the execution of said exception generative instruction the execution of instructions is inhibited, and converts an area in said program, within a predetermined range, so that the occurrence of an exception is detected when an exception is generated by at least one of multiple exception generative instructions, and a process is shifted to a corresponding exception process.

13. The compiler according to claim 12, wherein, when said exception generative instruction is accompanied by side effects, said optimization unit establishes order restrictions for said exception generative instructions in said graph, so that before said program is transformed the order restrictions concerning said side effects are stored.

14. A computer system comprising:

an input device for receiving a source code of a program;

a compiler for converting said program and converting said program into a machine language code; and a processor for executing said machine language code of said program, wherein said compiler analyzes said program, detects an exception generative instruction, which may generate an exception, and an exception generation detection instruction, which branches a process to an exception process when an exception occurrence condition is detected and an exception has occurred, divides said detected exception generation detection instruction into a first instruction, which detects said exception occurrence condition, and a second instruction, which branches said process to said exception process when said exception occurrence condition is detected, and establishes a dependency among the instructions, so that the process is shifted from said first instruction to said second instruction when said exception occurrence condition is detected, or so that the process is shifted from said first instruction to said exception generative instruction when an exception occurrence condition is not detected and wherein the computer system comprises an exception handler with compensation codes for each exception generation detection instruction.

15. The computer system according to claim 14, wherein said compiler collects a plurality of said second instructions obtained by a plurality of said exception generation detection instructions, so as to collectively determine that an exception occurrence condition is detected from a plurality of said first instructions that are obtained based on a plurality of said exception generation detection instructions within a predetermined range of said program.

16. A storage medium on which input means of a computer stores a computer-readable program that permits said computer to perform:

a process for analyzing said program, and detecting an exception generative instruction, which may generate an exception, and an exception generation detection instruction, which branches a process to an exception process when an exception occurrence condition is detected and an exception has occurred;

a process for dividing said detected exception generation detection instruction into a first instruction, which detects said exception occurrence condition, and a second instruction, which branches said process to said exception process when said exception occurrence condition is detected; and a process for establishing a dependency among the instructions, so that the process is shifted from said first instruction to said second instruction when said exception occurrence condition is detected, or so that the process is shifted from said first instruction to said exception generative instruction when an exception occurrence condition is not detected and wherein the storage medium comprises an exception handler with compensation codes for each exception generation detection instruction.

17. The storage medium according to claim 16, wherein, following said process for setting said dependency among the instructions, said program stored thereon further comprises a process for collecting a plurality of said second instructions obtained by a plurality of said exception generation instructions within a predetermined range of said program; and wherein said program collectively determines that an exception occurrence condition is detected from a plurality of said first instructions that are obtained based on a plurality of said exception generation detection instructions.

18. A program transmission apparatus comprising:

storage means for storing a program that permits said computer to perform a process for analyzing said program, and detecting an exception generative instruction, which may generate an exception, and an exception generation detection instruction, which branches a process to an exception process when an exception occurrence condition is detected and an exception has occurred, a process for dividing said detected exception generation detection instruction into a first instruction, which detects said exception occurrence condition, and a second instruction, which branches said process to said exception process when said exception occurrence condition is detected, and a process for establishing a dependency among the instructions, so that the process is shifted from said first instruction to said second instruction when said exception occurrence condition is detected, or so that the process is shifted from said first instruction to said exception generative instruction when an exception occurrence condition is not detected;

a transmission mechanism for reading said program from said storage means and transmitting said program; and an exception handler with compensation codes for each exception generation detection instruction.

19. The program transmission apparatus according to claim 18, wherein, following said process for setting said dependency among the instructions, said program stored thereon further comprises a process for collecting a plurality of said second instructions obtained by a plurality of said exception generation detection instructions within a predetermined range of said program; and wherein said program collectively determines that an exception occurrence condition is detected from a plurality of said first instructions that are obtained based on a plurality of said exception generation detection instructions.

* * * * *